Sept. 13, 1927.  W. A. MacKENZIE  1,642,550

SEALING RING

Filed May 19, 1926

Inventor.
William A. MacKenzie
by Hazard and Miller
Attorneys.

Witness:

Patented Sept. 13, 1927.

1,642,550

UNITED STATES PATENT OFFICE.

WILLIAM A. MacKENZIE, OF LONG BEACH, CALIFORNIA, ASSIGNOR TO AMERICAN BATTERY PRODUCTS CORPORATION, OF LONG BEACH, CALIFORNIA, A CORPORATION OF DELAWARE.

SEALING RING.

Application filed May 19, 1926. Serial No. 110,131.

This invention relates to improvements in sealing rings or post sustaining plugs used in connection with storage batteries and the like.

An object of the invention is to provide an improved sealing ring or post sustaining plug which is advantageous over the construction disclosed in my prior Patent No. 1,484,806, issued February 19, 1924.

Another object of the invention consists of providing a sealing ring or plug formed of an electrically non-conducting material and which is adapted to be sealed in place on a battery cell cover.

A further object of the invention is to provide a sealing plug of improved construction which will form with the aid of a fusible sealing material a very advantageous seal with the cover.

A still further object of the invention is to provide a construction for mounting battery posts upon the covers, which will enable the efficient use of a gasket for purposes hereinafter to be described.

Figure 1:
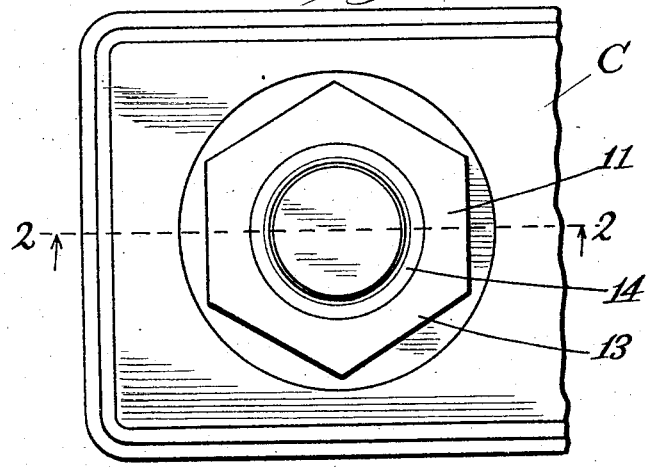
Figure 4:
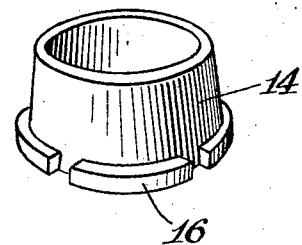
Figure 2:
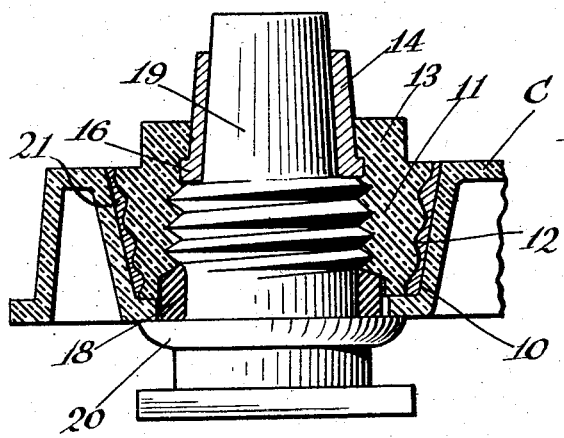
Figure 3:
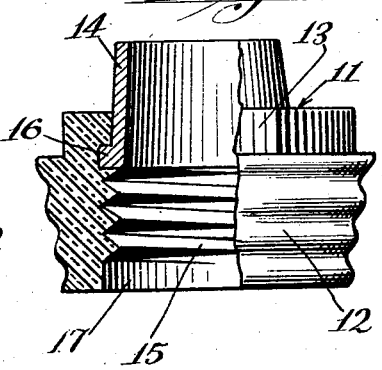

With the foregoing and other objects in view which will be made manifest in the following detailed description and specifically pointed out in the appended claims, reference is had to the accompanying drawings for an illustrative embodiment of the invention, wherein:

Figure 1 is a partial top plan view of a portion of a battery cell cover illustrating the improved sealing ring or post sustaining plug in applied position, Fig. 2 is a vertical section taken on the line 2—2 of Fig. 1, Fig. 3 is a view in side elevation, parts being broken away and shown in section illustrating the sealing ring or plug, and Fig. 4 is a perspective view of the ferrule used as a part of the plug.

Referring to the accompanying drawings wherein similar reference characters designate similar parts throughout, the battery cell cover is generally designated at C, having a depression 10 formed therein forming a socket. In this socket there is positioned the sealing ring or plug 11, preferably formed of an electrically non-conducting material, such as hard rubber. This plug is tapered in form and on its exterior surface there are formed a plurality of parallel grooves 12. The upper end of the plug is formed hexagonally in shape, as indicated at 13, to facilitate the application of a wrench or the like. Projecting from the top of the sealing ring is a metallic ferrule 14 which is arranged in alignment with the bore 15 formed in the plug. This ferrule is slightly tapered and has its lower end imbedded in the body of the sealing ring, and has flanges 16 for preventing its withdrawal. The bore 15 is internally threaded, as clearly shown upon the drawing, and at the very bottom of the plug it is slightly enlarged, as indicated at 17, to receive a flexible rubber gasket 18 adapted to be positioned about the battery post 19 above the shoulder 20 thereon. The battery post 19 is externally threaded in the usual manner and has its threads complementary to the threads on the interior of the sealing ring.

The improved sealing ring and battery post are assembled upon the cover in the following manner: The gasket 18 is first slipped on the battery post over the threads and positioned against the shoulder 20. The battery post 19 is inserted through the cover from the under side thereof. The post sustaining plug or sealing ring is then coated on its outside with a fusible sealing material, as indicated at 21, and is then slipped over the battery post and is screwed onto it, causing it to enter the socket 10. The plug is tightened thereon and compresses the gasket 18, the sealing material hardening and forming a seal between the plug and the cover C. When this has been done, a torch can be applied to the upper end of the ferrule 14 which is formed preferably of lead or the like, and this ferrule can be melted slightly, causing it to weld or fuse together with the top of the battery post 19.

The advantages of the improved construction are as follows: Heretofore when the body of the plug 11 was formed of metal, it has been found that there was a slight disadvantage in that current passing through it tended to decompose the sealing material 21 by electrolysis. By the improved arrangement the body of the plug 11 does not convey current and this electrolytic action does not take place. Furthermore, if any water should happen to be spilled on top of the battery, it will not establish a circuit between the positive and negative poles, which would be the case if the upstanding portion 13 were formed of metal. The use of a non-conducting material, such as hard rubber, also enables the plug to be colored, such, for example, as using a red plug on a positive pole and a black plug upon the negative pole. The gasket 18 being compressed between the plug and the shoulder 20 effectively prevents any escape of acid which might creep up between the post and the plug or between the plug and the cover, the last mentioned escape being especially disadvantageous in that it tends to decompose the sealing material. In addition to the above advantages, the improved plug can be made much cheaper than where the entire plug is formed of metal, such as lead, and, furthermore, it is much lighter, reducing the weight on the cover.

From the above described construction it will be readily appreciated that the improved sealing ring is very advantageous and can be easily, quickly and cheaply constructed.

It will be understood that various changes may be made in the detail of construction without departing from the spirit or scope of the invention as defined by the appended claims.

I claim:

1. A battery cell cover having a socket therein, a post sustaining plug fitting in said socket, said plug having a plurality of parallel grooves formed upon its exterior surface, and a fusible sealing material disposed in said grooves and between the plug and the cover.

2. A battery cell cover having a socket therein, a post sustaining plug fitting in said socket, said plug having a plurality of parallel grooves formed upon its exterior surface, and a fusible sealing material disposed in said grooves and between the plug and the cover, said plug being formed of an electrically non-conducting material.

3. A battery cell cover having a socket therein, a post sustaining plug fitting in said socket, said plug having a plurality of parallel grooves formed upon its exterior surface, a fusible sealing material disposed in said grooves and between the plug and the cover, said plug being formed of an electrically non-conducting material, and a post extending through the cover and plug and being threadedly connected to the plug.

4. A battery cell cover having a socket therein, a post sustaining plug fitting in said socket, said plug having a plurality of parallel grooves formed upon its exterior surface, and a fusible sealing material disposed in said grooves between the plug and the sides of said socket, said plug being formed of an electrically non-conducting material.

In testimony whereof I have signed my name to this specification.

W. A. MacKENZIE.